United States Patent
Takizawa (10) Patent No.: US 7,515,227 B2
(45) Date of Patent: Apr. 7, 2009

(54) TRANSFLECTIVE LIQUID CRYSTAL DEVICE COMPRISING PIXELS ALONG AN EDGE OF THE DISPLAY REGION HAVING SMALLER TRANSMITTING PORTIONS (75) Inventor: Keiji Takizawa, Suwa (JP)

(73) Assignee: Seiko Epson Corporation (JP)

( * ) Notice: Subject to any disclaimer, the term of this patent is extended or adjusted under 35 U.S.C. 154(b) by 607 days.

(21) Appl. No.: 11/063,438

(22) Filed: Feb. 23, 2005

(65) Prior Publication Data
US 2005/0185121 A1 Aug. 25, 2005

(30) Foreign Application Priority Data
Feb. 24, 2004 (JP) ............... 2004-048497
Dec. 17, 2004 (JP) ............... 2004-366186

(51) Int. Cl.
G02F 1/1335 (2006.01)
(52) U.S. Cl. ............ 349/114; 349/109; 349/106
(58) Field of Classification Search ............... None
See application file for complete search history.

(56) References Cited

U.S. PATENT DOCUMENTS
6,812,981 B2    11/2004   Yoshino
2002/0154257 A1*  10/2002  Iijima .................. 349/67

FOREIGN PATENT DOCUMENTS
JP  11-109417      4/1999
JP  2001-215492    8/2001
JP  2002-55337     2/2002
JP  2003-121833    4/2003
JP  2003-122273    4/2003
JP  2003-295176    10/2003

OTHER PUBLICATIONS
Machine Translated copy of JP2003-295176.*
Communication from Japan Patent Office regarding counterpart application.
Communication from China Patent Office regarding counterpart application.
Examination result issued in corresponding Japanese application.

* cited by examiner

Primary Examiner—David Nelms
Assistant Examiner—W. Patty Chen
(74) Attorney, Agent, or Firm—Harness, Dickey & Pierce, P.L.C.

(57) ABSTRACT

A liquid crystal device includes a reflective layer provided on one side of a color filter substrate facing a liquid crystal layer and dividing each of a plurality of pixels into a reflecting portion and an opening. The reflecting portion reflects incident light from a counter substrate side toward the counter substrate, and the opening transmits incident light from the color filter substrate side toward the counter substrate. A region where the pixels are provided is divided into a plurality of sub-regions, and the area of the opening is different for each sub-region. In a first sub-region in which the area of the opening is small, the amount of light reflected by the reflecting portion is large as compared to another sub-region in which the area of the opening is greater than that of the first sub-region.

2 Claims, 8 Drawing Sheets

TRANSFLECTIVE LIQUID CRYSTAL DEVICE COMPRISING PIXELS ALONG AN EDGE OF THE DISPLAY REGION HAVING SMALLER TRANSMITTING PORTIONS

RELATED APPLICATIONS

This application claims priority to Japanese Patent Application Nos. 2004-048497 filed Feb. 24, 2004 and 2004-366186 filed Dec. 17, 2004 which are hereby expressly incorporated by reference herein in their entirety.

BACKGROUND

1. Technical Field

The present invention relates to a transflective liquid crystal device having a reflecting display mode function and a transmitting display mode function.

2. Related Art

Conventionally, a transflective liquid crystal display device having a reflecting display mode function and a transmitting display mode function is known. In each pixel of a liquid crystal panel used for such a liquid crystal display device, a reflecting layer that reflects incident light from a viewing side is provided. Further, in each reflecting layer, an opening that transmits incident light from a backlight provided on a back surface side of the liquid crystal panel is provided. Furthermore, by overlapping a color filter on the reflecting layer, a color display can be achieved.

By the way, when a color display is performed through such a transflective liquid crystal display device, during the reflecting display mode, incident light from a viewing side passes through a color filter twice until the incident light is reflected by the reflective layer to be transmitted toward the viewing side. On the other hand, during the transmitting display mode, the incident light from the backlight passes through the color filter only once until the incident light is transmitted toward the viewing side. For this reason, the brightness of an image in the reflecting display mode is lower than the brightness of an image in the transmitting display mode. Further, the saturation of the image in the transmitting display mode is lower than the saturation of the image in the reflecting display mode.

In order to solve these problems, various technologies have been suggested. For example, a conventional art disclosed in Japanese Unexamined Patent Application Publication No. 2003-122273 has a configuration that only a part of a reflecting surface of a reflecting layer provided in every pixel is covered with a color filter. According to this configuration, since a part of the incident light from a viewing side is reflected without passing through a color filter, the brightness of an image increases and the saturation of the image decreases in the reflecting display mode. As a result, it is possible to eliminate the difference in the brightness and the difference in the saturation of the image between the reflecting display mode and the transmitting display mode.

Figure 4:
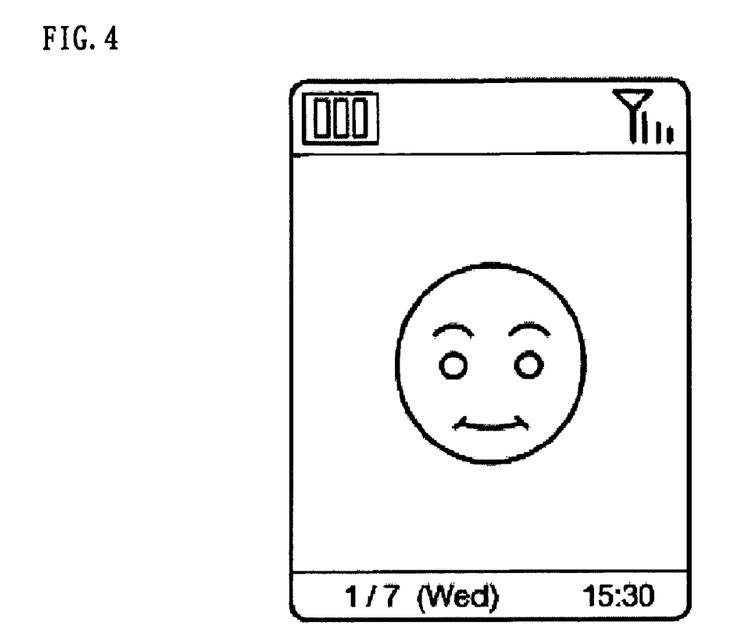
FIG. 4 is a diagram showing an example of an image displayed on a screen 710.

Recently, the use of mobile phones having a built-in transflective liquid crystal display device has been widely spread. Most of the mobile phones are constructed such that while an operating button is operated, a backlight is turned on to perform a transmitting display mode, and while the operating button is not operated for a predetermined time, the backlight is turned off to be in a reflecting display mode. As a result, it is possible to display an image having high visibility during operation and to suppress power consumption during stand-by state. However, since the area of an opening in most of such mobile phones is determined by taking a serious view of the brightness of display in the transmitting display mode, the images in the reflecting display mode have a low visibility as compared to the transmitting display mode. As shown in FIG. 4, while the power is on, on the screen of the mobile phone, images displaying information such as date, time and battery level, which are useful for a user even during the stand-by state, are always displayed. Nevertheless, when the display mode of the mobile phone is changed to a reflecting display mode, the screen of the mobile phone becomes dark. As a result, it is difficult to view the images. Although the brightness of the images in the reflecting display mode can be improved by using a technology disclosed in Japanese Unexamined Patent Application Publication No. 2003-122273, a sufficient brightness of the images in the transmitting display mode cannot be obtained.

Accordingly, the present invention is designed to solve the above-mentioned problems, and it is an object of the present invention to provide a transflective liquid crystal display device capable of improving the visibility of an image in the reflecting display mode while ensuring a sufficient visibility of the image in the transmitting display mode.

SUMMARY

In order to solve the above-mentioned problems, according to one aspect of the present invention, there is provided a liquid crystal device comprising: a first substrate and a second substrate provided opposite to each other; a liquid crystal layer interposed between the first substrate and the second substrate; a plurality of pixels provided correspondingly to intersections of a plurality of scanning lines and a plurality of data lines; a reflective layer provided on a surface of the second substrate facing the liquid crystal layer and dividing each pixel of the plurality of pixels into a reflecting portion and a transmitting portion, the reflecting portion reflecting incident light from the first substrate side toward the first substrate side, and the transmitting portion transmitting incident light from the second substrate side toward the first substrate side; and a colored layer provided on one side of the first or second substrate facing the liquid crystal layer so as to overlap the reflective layer as seen from a direction perpendicular to a plane of the first substrate, for selectively transmitting light having a specific wavelength, wherein a region on which the plurality of pixels are arranged is divided into a plurality of sub-regions as seen from a direction perpendicular to a plane of the first substrate, and the area of the transmitting portion is different for each of the sub-regions.

According to this aspect, in the sub-region in which the area of the transmitting portion is small, the amount of light reflected by the reflecting portion is large as compared to another sub-region in which the area of the transmitting portion is greater than that of the sub-region. Therefore, even when light transmitting the transmitting portion does not exist, an image having a sufficient brightness can be displayed on the sub-region in which the area of the transmitting portion is small.

From another point of view, a liquid crystal device according to the present invention comprises a plurality of pixels which are arranged in a planar shape and each having a reflecting portion and a transmitting portion. A region on which the plurality of pixels are arranged has a first sub-region and a second sub-region, and the area of the transmitting portion of each pixel belonging to the first region is different from the area of the transmitting portion of each pixel belonging to the second region. In addition, the liquid crystal device according to this aspect can display a color image by arranging a colored layer. However, the colored layer is not an essential element, and may be used as an element for displaying the images of the black and white colors. More specifically, the first region is a central region of each substrate, the second region is a region located more toward the circumference of each substrate than the first region, and the area of the transmitting portion of each pixel belonging to the first region is greater than the area of the transmitting portion of each pixel belonging to the second region. For example, the second region is located at both sides of the substrate with the first region interposed therebetween.

According to another aspect of the present invention, there is provided a liquid crystal device comprising: a first substrate and a second substrate provided opposite to each other; a liquid crystal layer interposed between the first substrate and the second substrate; a plurality of pixels provided correspondingly to intersections of a plurality of scanning lines and a plurality of data lines; a reflective layer provided on a surface of the second substrate facing the liquid crystal layer and dividing each pixel of the plurality of pixels into a reflecting portion and a transmitting portion, the reflecting portion reflecting incident light from the first substrate side toward the first substrate side, and the transmitting portion transmitting an incident side from the second substrate side toward the first substrate side; a colored layer provided on one side of the first or second substrate facing the liquid crystal layer so as to overlap the reflective layer as seen from a direction perpendicular to a plane of the first substrate, for selectively transmitting light having a specific wavelength; and a non-colored portion which does not overlap the colored layer, in the reflecting portion, wherein a region on which the plurality of pixels are arranged is divided into a plurality of sub-regions as seen from a direction perpendicular to a plane of the first substrate, and the area of the non-colored portion is different for each of the sub-regions.

According to this aspect, in the sub-region in which the area of the non-colored portion is large, the amount of light reflected by the non-colored portion is large as compared to another sub-region in which the area of the transmitting portion is greater than that of the non-colored portion of the sub-region. Therefore, even when light transmitting the transmitting portion does not exist, an image having a sufficient brightness and a lowered saturation can be displayed on the sub-region in which the area of the non-colored portion is large.

In the liquid crystal device having the above-mentioned structure, it is preferable that a plurality of different colored layers each selectively transmitting light having a wavelength corresponding to a different color is further comprised, and the area of the non-colored portion is different for each color. According to this structure, it is possible to improve the brightness by using a difference of a relative luminous efficiency according to a color without excessively lowering the saturation of an image.

From another point of view, a liquid crystal device according to the present invention comprises: a plurality of pixels arranged in a planar shape, each having a reflecting portion and a transmitting portion; and a colored layer provided on one side of the pair of substrates so as to partially overlap the reflecting portion of each pixel, wherein a region on which the plurality of pixels are arranged has a first sub-region and a second sub-region, and the area of a non-colored portion where the colored layer does not overlap, in the reflecting portion of each pixel belonging to the first region, is different from the area of a non-colored portion of the reflecting portion of each pixel belonging to the second region. More specifically, the first region is a central region of each substrate, the second region is a region located more toward the circumference of each substrate than the first region, and the area of the non-colored portion of each pixel belonging to the first region is smaller than the area of the non-colored portion of each pixel belonging to the second region. For example, the second region is located at both sides of the substrate with the first region interposed therebetween.

In the liquid crystal device according to the respective aspect of the present invention, the areas of all the pixels belonging to the first region are equal to each other, and the areas of all the pixels belonging to the second region are equal to each other.

In addition, an electronic apparatus according to the present invention has the above-mentioned liquid crystal device.

According to the present invention, there is provided a color filter substrate in a liquid crystal device having a color filter substrate and a counter substrate provided opposite to each other, a liquid crystal layer interposed between the color filter substrate and the counter substrate, and a plurality of pixels provided correspondingly at intersections of a plurality of scanning lines and a plurality of data lines, comprising: a reflective layer provided on one side of the color filter substrate facing the liquid crystal layer and dividing each pixel of the plurality of pixels into a reflecting portion and a transmitting portion, the reflecting portion reflecting incident light from the counter substrate side back toward the counter substrate side, and the transmitting portion transmitting incident light from the color filter substrate side toward the counter substrate side; and a colored layer provided on the one side of the color filter substrate facing the liquid crystal layer so as to overlap the reflective layer as seen from a direction perpendicular to a plane of the color filter substrate, for selectively transmitting light having a specific wavelength, wherein a region on which the plurality of pixels are arranged is divided into a plurality of sub-regions as seen from a direction perpendicular to a plane of the color filter substrate, and the area of the transmitting portion is different for each of the sub-regions.

From another point of view, a color filter substrate according to the present invention comprises: a reflective layer provided on one side of the color filter substrate facing the liquid crystal layer and dividing each pixel of the plurality of pixels into a reflecting portion and a transmitting portion, the reflecting portion reflecting incident light from the counter substrate side back toward the counter substrate side, and the transmitting portion transmitting incident light from the color filter substrate side toward the counter substrate side; and a colored layer provided on one side of the color filter substrate facing the liquid crystal layer so as to overlap the reflective layer as seen from a direction perpendicular to a plane of the color filter substrate, for selectively transmitting light having a specific wavelength, wherein a region on which the plurality of pixels are arranged has a first sub-region and a second sub-region, and the area of the transmitting portion of each pixel belonging to the first region is different from the area of the transmitting portion of each pixel belonging to the second region. More specifically, the first region is a central region of the color filter substrate, the second region is a region located more toward the circumference of the color filter substrate than the first region, and the area of the transmitting portion of each pixel belonging to the first region is greater than the area of the transmitting portion of each pixel belonging to the second region.

According to the present invention, there is provided a color filter substrate in a liquid crystal device having a color filter substrate and a counter substrate provided opposite to each other, a liquid crystal layer interposed between a color filter substrate and a counter substrate, and a plurality of pixels provided correspondingly at intersections of a plurality of scanning lines and a plurality of data lines, comprising: a reflective layer provided on one side of the color filter substrate facing the liquid crystal layer and dividing each pixel of the plurality of pixels into a reflecting portion and a transmitting portion, the reflecting portion reflecting incident light from the counter substrate side back toward the counter substrate side, and the transmitting portion transmitting incident light from the color filter substrate side toward the counter substrate side; a colored layer provided on one side of the color filter substrate facing the liquid crystal layer so as to overlap the reflective layer as seen from a direction perpendicular to a plane of the color filter substrate, for selectively transmitting light having a specific wavelength; and a non-colored layer which does not overlap the colored layer, in the reflecting portion, wherein a region on which the plurality of pixels are arranged is divided into a plurality of sub-regions as seen from a direction perpendicular to a plane of the color filter substrate, and the area of the non-colored portion is different for each of the sub-regions.

From another point of view, a color filter substrate according to the present invention comprises: a reflective layer provided on one side of the color filter substrate facing the liquid crystal layer and dividing each pixel of the plurality of pixels into a reflecting portion and a transmitting portion, the reflecting portion reflecting incident light from the counter substrate side back toward the counter substrate side, and the transmitting portion transmitting incident light from the color filter substrate side toward the counter substrate side; and a colored layer provided on one side of the color filter substrate facing the liquid crystal layer so as to partially overlap the reflecting portion as seen from a direction perpendicular to a plane of the color filter substrate, for selectively transmitting light having a specific wavelength, wherein a region on which the plurality of pixels are arranged has a first sub-region and a second sub-region, and the area of the non-colored layer where the colored layer does not overlap, in the reflecting portion of the pixel belonging to the first region, is different from the area of the non-colored portion of the reflecting portion of each pixel belonging to the second region. More specifically, the first region is a central region of the color filter substrate, the second region is a region located more toward the circumference of the color filter substrate than the first region, and the area of a non-colored portion of each pixel belonging to the first region is smaller than the area of a transmitting portion of each pixel belonging to the second region.

DETAILED DESCRIPTION

First Embodiment

Hereinafter, a first embodiment of the present invention will be described with reference to the accompanying drawings. In the drawings in use for the following description, for the purpose of easy understanding, a size ratio and an aspect ratio of each constituent element are different from an actual size ratio and an actual aspect ratio thereof.

Figure 1:
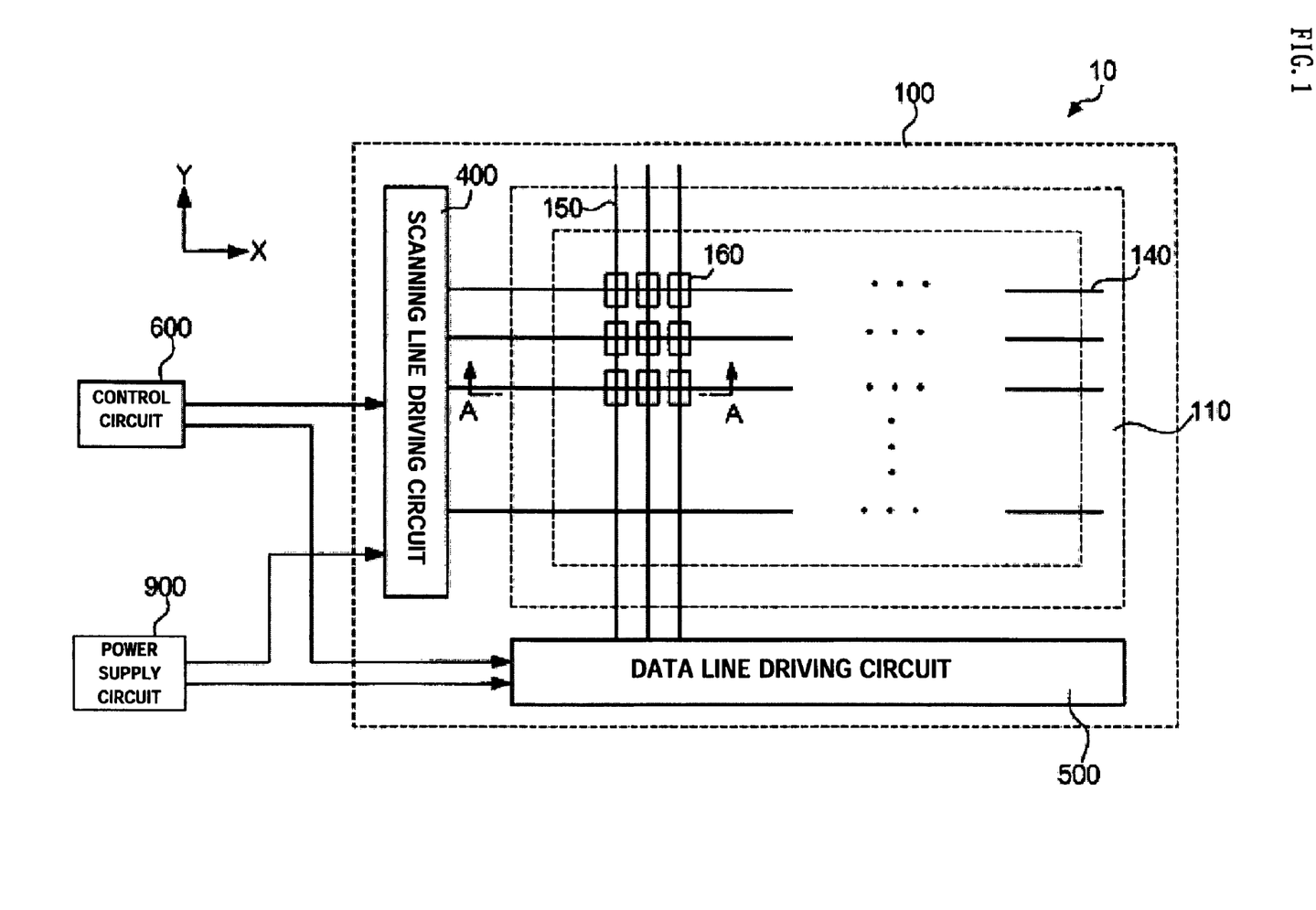
FIG. 1 is a diagram showing a structure of a liquid crystal device 10.

FIG. 1 is a diagram showing a structure of a liquid crystal device 10 according to a first aspect of the present invention. As shown in FIG. 1, the liquid crystal device 10 comprises a liquid crystal panel 100, a control circuit 600 and a power supply circuit 900. The liquid crystal panel 100 has a plurality of data lines 150 extending in a direction of column (direction of Y) and a plurality of scanning lines 140 extending in a direction of row (direction of X). Pixels 160 are provided correspondingly at each intersection of the data lines 150 and the scanning lines 140. The pixel 160 has a TFD (thin film diode) serving as a two-terminal switching element and a liquid crystal capacitor connected in series to the TFD. The liquid crystal capacitor is constructed such that the liquid crystal is interposed between the scanning line 140 serving as a band-shaped transparent electrode and a pixel electrode described later.

A scanning line driving circuit 400 selects the scanning lines 140 one by one, and then supplies a selection voltage to the selected scanning line 140 and a non-selection voltage to the other scanning lines 140. A data line driving circuit 500 supplies data signals according to gradation indicated by gradation data to the pixels 160 for one row corresponding to the scanning line 140 selected by the scanning line driving circuit 400 through the data lines 150.

The control circuit 600 supplies to the scanning line driving circuit 400 and the data line driving circuit 500 various signals such as a scanning signal and a clock signal so as to perform a vertical scanning and a horizontal scanning for the liquid crystal panel 100. In addition, the control circuit 600 supplies gradation data indicating a gradation of the pixel 160 to the data line driving circuit 500 in synchronization with the vertical scanning and the horizontal scanning. The power supply circuit 900 supplies an electric power to the scanning line driving circuit 400 and the data line driving circuit 500.

Figure 2:
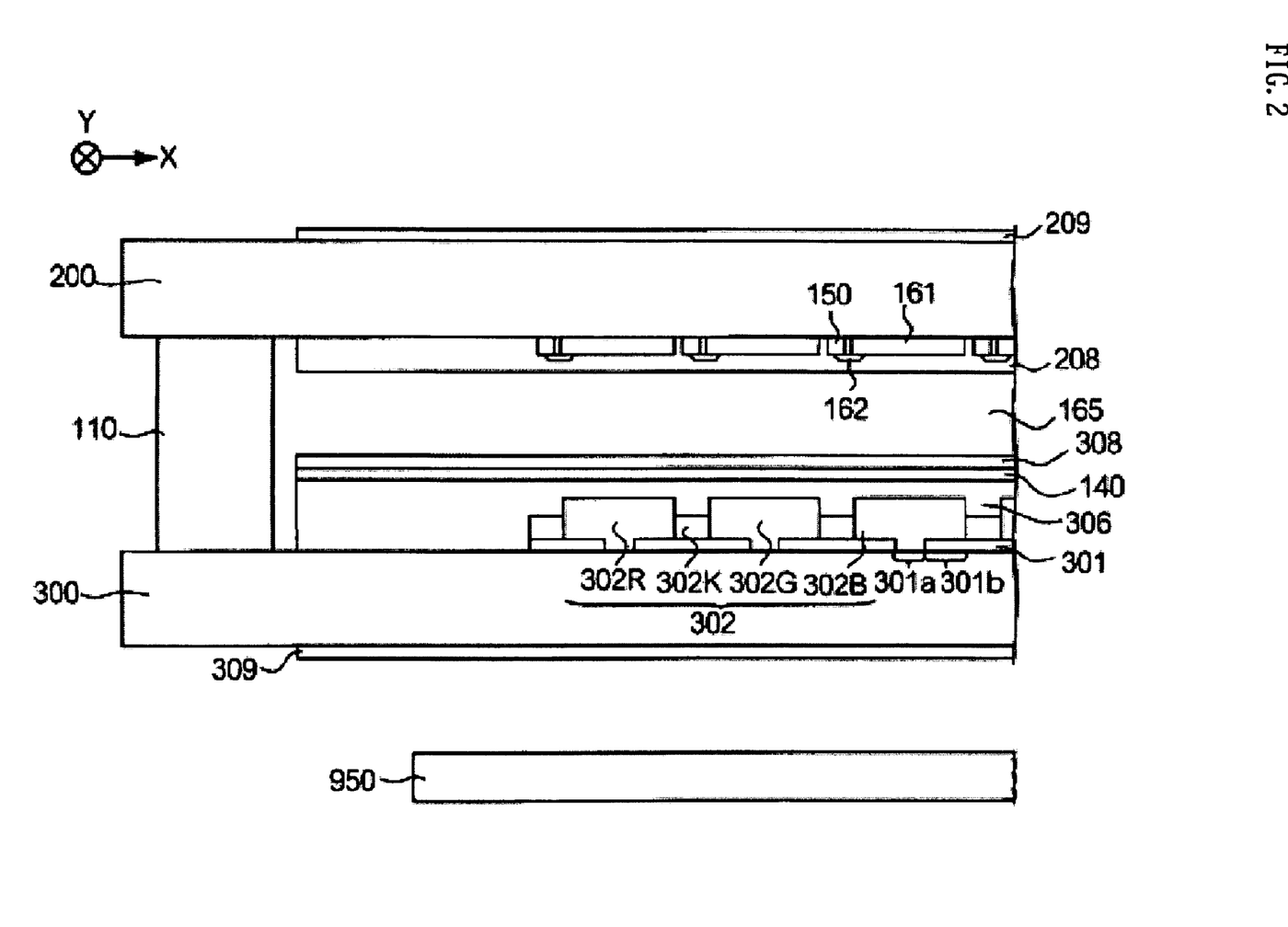
FIG. 2 is a cross-sectional view of a liquid crystal panel.

FIG. 2 is a cross-sectional view of the liquid crystal panel 100 taken along the line A-A of FIG. 1. In FIG. 2, only three pixels are shown among a plurality of pixels 160 provided on the liquid crystal panel 100. As shown in FIG. 2, the liquid crystal panel 100 includes a color filter substrate (second substrate) 300 located at a back surface side and a counter substrate (first substrate) 200 facing the color filter substrate 300 as seen from the viewing side. The color filter substrate 300 and the counter substrate 200 are bonded to each other at a predetermined gap through a sealing material 110. In a space surrounded by the color filter substrate 300, the counter substrate 200 and the sealing material 110, for example, TN (twisted nematic) liquid crystals are injected, so that a liquid crystal layer 165 is formed. In addition, the liquid crystal panel 100 is a transflective liquid crystal panel, which has a transmitting display mode function that implements a display by transmitting incident light from a back surface side to a viewing side and a reflecting display mode function that implements the display by reflecting the incident light from the viewing side. At the back surface side of the color filter substrate 300A is provided a backlight 950 that irradiates light equally.

As shown in FIG. 2, on a surface of the color filter substrate 300 which faces the counter substrate 200, a reflective layer 301, a colored layer 302R, a colored layer 302G, a colored layer 302B, a shielding layer 302K, a protective layer 306, a scanning line 140 and an alignment film 308 are provided. An opening 301a for transmitting the incident light from the backlight 950 is formed in the reflective layer 301. The colored layers 302R, 302G, and 302B have optical transparency and are coated with red (R) color, green (G) color, and blue (B) color, respectively. In other words, the colored layer 302R selectively transmits light having a wavelength corresponding to the red color. Similarly, the colored layers 302G and 302B selectively transmit lights having wavelengths corresponding to the green color and the blue color, respectively. The shielding layer 302K is a black matrix made of a metal or resin for shielding light from the backlight 950. In addition, the shielding layer 302K may be formed by laminating the colored layer 302R, the colored layer 302G, and the colored layer 302B. In a following description, a collection of the colored layer 302R, the colored layer 302G, the colored layer 302B, and the shielding layer 302K is called a color filter 302. In addition, in the reflective layer 301, a portion that is not covered with the shielding layer 302K and where the opening 301a is excluded is called a reflecting portion 301b. In addition, a 'transmitting portion' of the present invention corresponds to the opening 301a of the present embodiment.

The protective layer 306 is a layer that eliminates a level difference of the color filter 302 to flatten it and protects the color filter 302. The scanning line 140 is a band-shaped transparent electrode extending in a direction of row (direction of X). The alignment film 308 is subjected to a rubbing process in a predetermined direction. A polarizing plate 309 is attached to the outside (back surface side) of the color filter substrate 300 and a direction in an absorption axis thereof is selected according to the direction of the rubbing process for the alignment film 308.

On the other hand, on the surface of the counter substrate 200 facing the color filter substrate 300, an alignment film 208 subjected to a rubbing process in a predetermined direction as well as TFDs 162 and pixel electrodes 161 serving as rectangular transparent electrodes provided in vicinities of the data lines 150 extending in a direction of row (direction of Y) are formed. A polarizing plate 209 is attached to the outside (observing side) of the counter substrate 200 and a direction in an absorption axis thereof is selected according to the direction of the rubbing process for the alignment film 208.

Figure 3A:
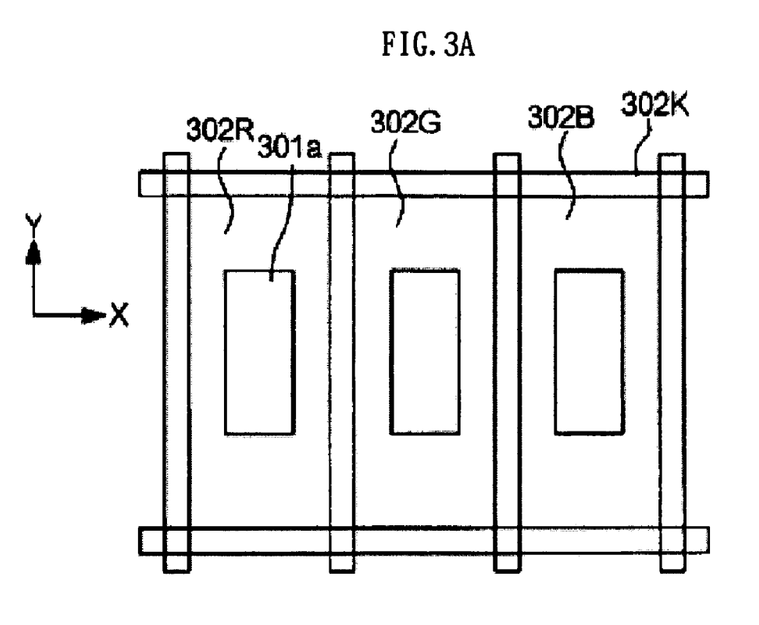
FIG. 3 is a diagram of a color filter 302 as seen from a viewing side.
Figure 3B:
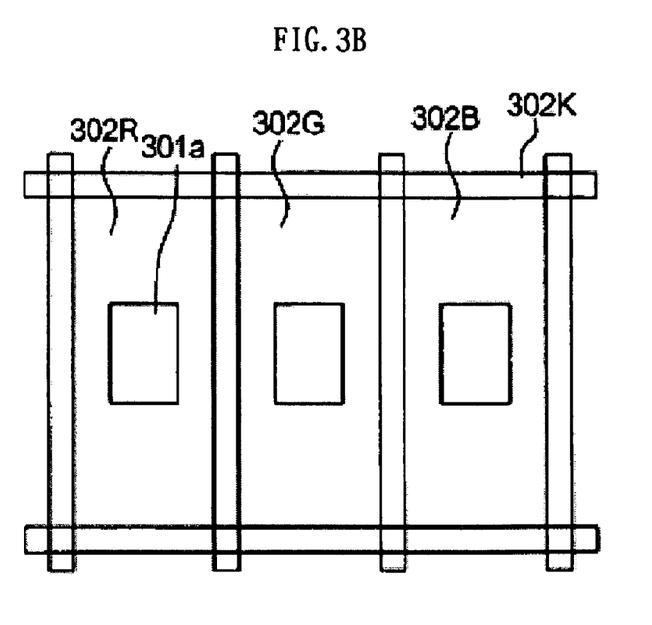

FIG. 3 is a diagram of the color filter 302 provided on the surface of the color filter substrate 300 facing the counter substrate 200, as seen from a viewing side. FIGS. 3(a) and 3(b) show color filter 302 provided on two different regions of the color filter substrate 300. Here, a region shown in FIG. 3(a) is referred to as a first region and a region in FIG. 3(b) is referred to as a second region. Each of the first and second regions has portions corresponding to three pixels of red color, green color and blue color. The color filter 302 is provided so as to cover the reflective layer 301, and the opening 301a of the reflective layer 301 is provided so as to be located at a central portion of each colored layer. The shielding layer 302K is provided such that it fills the gaps between the colored layer 302R, the colored layer 302G and the colored layer 302B.

As shown in FIGS. 3(a) and 3(b), the opening 301a provided in the second region is formed such that the area in the xy plane is smaller than the area of the opening 301a provided in the first region. According to this configuration, during a reflecting display mode in the second region, the amount of the reflecting light which transmits each colored layer to be reflected is larger than that in the first region, so that an image having higher brightness than an image displayed on the first region is displayed on the second area. On the other hand, during the transmitting display mode in the second region, the amount of the transmitting light is lower than that in the first region, so that an image having lower brightness than an image displayed on the first region is displayed on the second area.

Figure 5A:
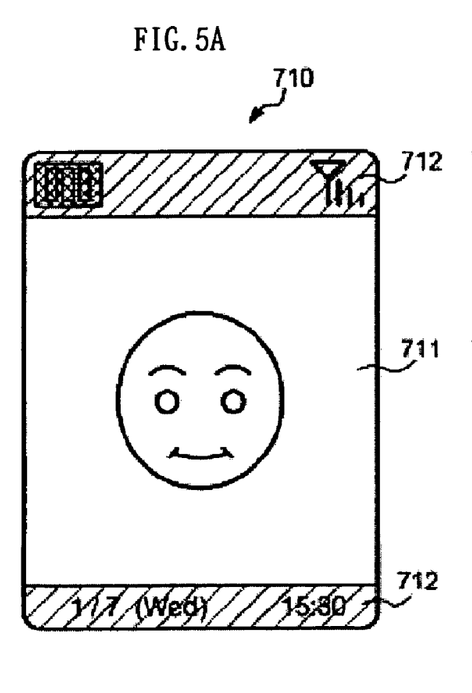
FIGS. 5A and 5B are diagrams illustrating a structure of a screen 710.
Figure 5B:
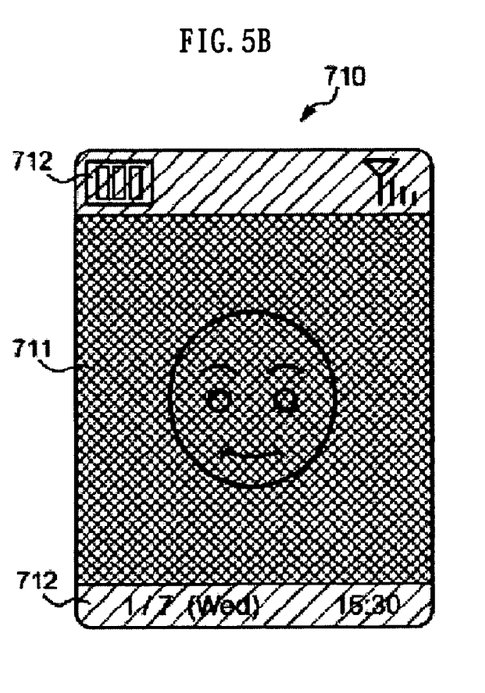
Figure 14:
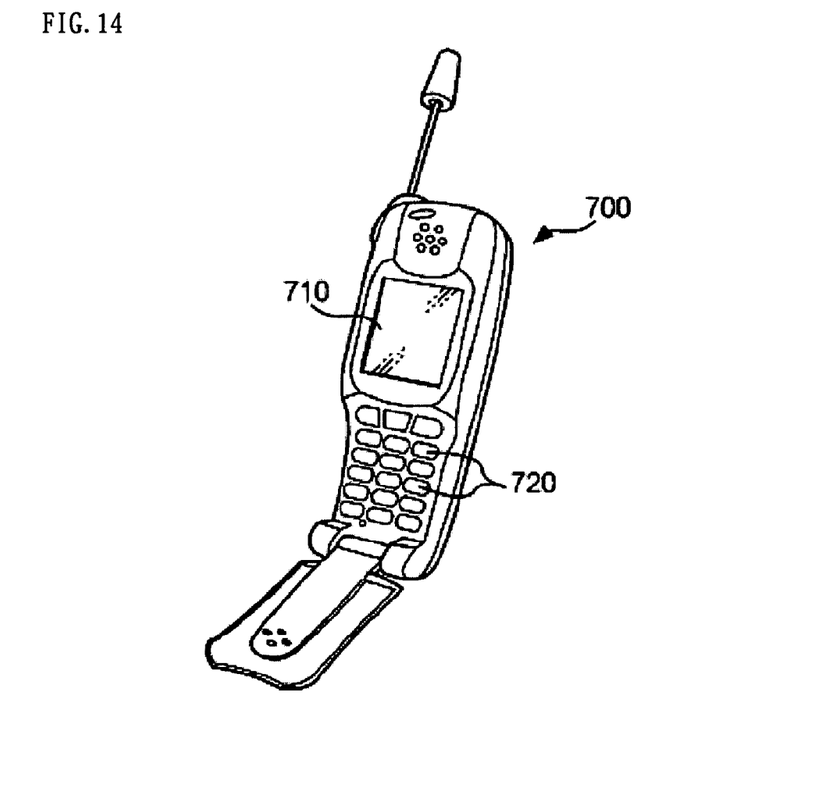
FIG. 14 is a diagram showing a mobile phone 700 using a liquid crystal device 10.

Here, a mobile phone is exemplified to describe an example of the electronic apparatus using the above-mentioned liquid crystal device 10. FIG. 14 is a diagram showing a mobile phone 700 using a liquid crystal device 10. A screen 710 is a surface at the counter substrate 200 side of the liquid crystal panel 100. FIG. 5 is a diagram showing a structure of the screen 710. The screen 710 includes a display region divided into reflection weighting regions 712 provided at upper and lower ends of the screen 710 and a transmission weighting region 711 provided between the reflection weighting regions 712. The reflection weighting region 712 provided at the upper end of the screen 710 is a region on which information indicating a battery level and reception strength of the mobile phone 700 is displayed. In addition, the reflection weighting region 712 provided at the lower end of the screen 710 is a region on which information such as date and time is displayed. The transmission weighting region 711 is a region for displaying images informing a user of arrival of signal or message, a waiting screen and digital photographing images in addition to displaying figures and characteristics inputted by a user through an operating button 720. In addition, only one reflection weighting region 712 may be provided at any one of the upper end or the lower end of the transmission weighting region 711. In addition, the reflection weighting region 712 may be provided at least one side of the left end and the right end of the screen 710.

The reflective layer 301 and the color filter 302 provided in the transmission weighting region 711 have a configuration of the first region shown in FIG. 3(a), and the reflective layer 301 and the color filter 302 provided in the reflection weighting region 712 have a configuration of the second region shown in FIG. 3(b). In other words, the opening 301a provided in the reflection weighting region 712 is formed such that the area in the xy plane is smaller than the opening 301a provided in the transmission weighting region 711.

Here, the images displayed on the screen 710 during the transmitting display mode will be compared to the images displayed on the screen 710 during the reflecting display mode. FIG. 5(a) shows the images displayed on the screen 710 during the transmitting display mode and FIG. 5(b) shows the images displayed on the screen 710 during the reflecting display mode. FIGS. 5(a) and 5(b) shows a state in which a difference of brightness between the images displayed on the transmission weighting region 711 and the reflection weighting region 712 is emphasized. During the transmitting display mode, a backlight 950 is turned on, and as shown in FIG. 5(a), an image having sufficient brightness is displayed on the transmission weighting region 711. In addition, the images displayed on the reflection weighting region 712 has lower brightness than that of an image displayed on the transmission weighting region 711 because area of the opening 301a decrease.

On the other hand, during the reflecting display mode, the backlight 950 is turned off, and as shown in FIG. 5(b), the brightness of the transmission weighting region 711 remarkably decreases. In the transmission weighting region 711, the area of the opening 301a is determined such that sufficient visibility can be ensured when the backlight 950 is turned on. As a result, when the backlight 950 is turned off, the visibility gradually deteriorates. In addition, since light transmitting the openings 301a does not exist, brightness of the image is reduced in the reflection weighting region 712. At this time, the reduced amount of the brightness in the reflection display region is smaller than that in the transmission weighting region 711. Also, since the area of a region where the opening 301a is extracted from the reflective layer 301 is greater than the transmission weighting region 711, the reflection weighting region 712 has a higher brightness than the transmission weighting region 711. In addition, the area of the opening 301a is determined through tests such that a brightness of an image displayed on the reflection weighting region 712 in the reflecting display mode can be sufficiently ensured.

As described above, according to the first embodiment of the present invention, in the reflection weighting region in which the areas of the openings are small, the amount of light reflected by the reflection portion is greater than that in the transmission weighting region having a bigger opening area. Therefore, during the reflecting display mode in which light transmitting the opening does not exist, images having a sufficient brightness can be displayed on the reflection weighting region.

Second Embodiment

Hereinafter, a second embodiment of the present invention will be described with reference to the accompanying drawings. Here, features that are different from those of the first embodiment will be described.

Figure 6A:
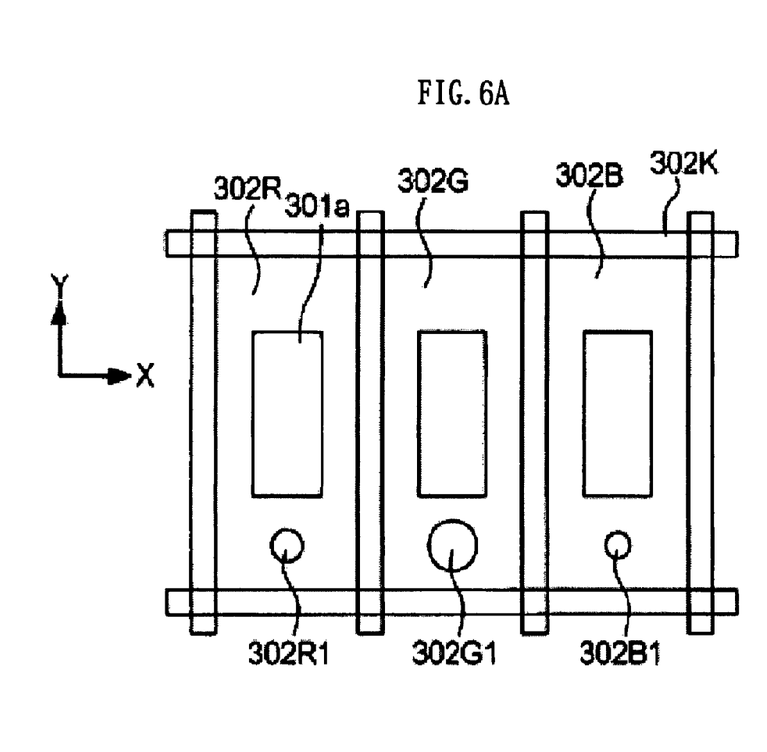
FIGS. 6A and 6B are diagrams of a color filter 302 as seen from a viewing side.
Figure 6B:
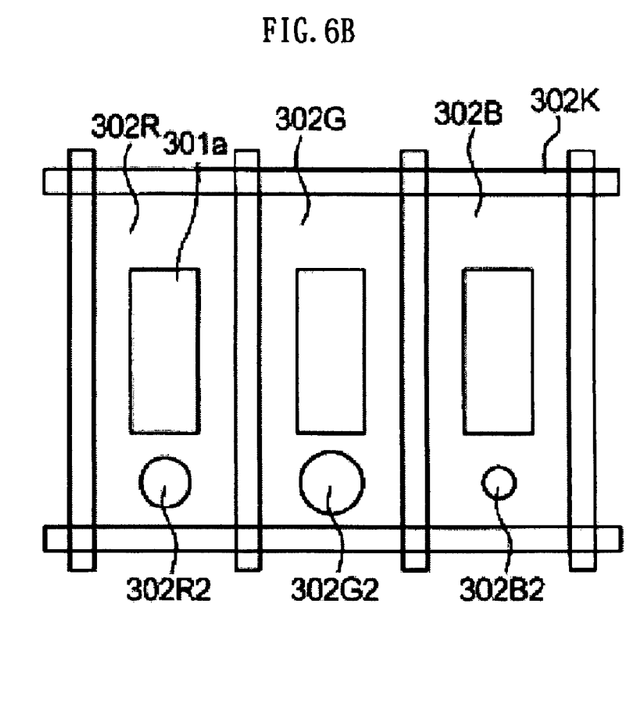

FIG. 6 is a diagram of the color filter 302 provided on a surface of the color filter substrate 300 facing the counter substrate 200, as seen from a viewing side. FIGS. 6(a) and 6(b) show color filters 302 provided on two different regions of the color filter substrate 300. Here, a region shown in FIG. 6(a) is referred to as a first region and a region shown in FIG. 6(b) is referred to as a second region. Referring to FIGS. 4 and 5 again, the transmission weighting region 711 on the screen 710 corresponds to the first region and the reflection weighting region 712 on the screen 710 corresponds to the second region. Each of the first and second regions has portions corresponding to three pixels of red color, green color and blue color. The color filter 302 is provided so as to cover the reflective layer 301 and the opening 301a of the reflective layer 301 is provided so as to be located at a central portion of each colored layer. The shielding layer 302K is provided such that it fills the gaps between the colored layer 302R, the colored layer 302G and the colored layer 302B.

According to the second embodiment, areas of the openings 301a in the xy plane are equal to each other in the first and second regions. In addition, a non-colored portion for exposing a part of the reflective layer is provided in each colored layer. In the present embodiment, a shape of the non-colored portion is circular, but any shape is possible. A non-colored portion 302R1, a non-colored portion 302G1 and a non-colored portion 302B1 are provided to the colored layer 302R, the colored layer 302G and the colored layer 302B in the first region, respectively. A non-colored portion 302R2, a non-colored portion 302G2 and a non-colored portion 302B2 are provided in the colored layer 302R, the colored layer 302G and the colored layer 302B in the second region, respectively. At these non-colored portions, incident light from a viewing side is reflected by the reflective layers 301 toward the viewing side without passing trough each colored layer. As a result, during the reflecting display mode, a brightness of an image is improved and a saturation of the image is lowered.

When a color display is performed through a conventional transflective liquid crystal display device, during a reflecting display mode, incident light from a viewing side passes trough the color filter twice until the incident light is reflected by the reflective layer to be radiated toward the viewing side. On the other hand, during a transmitting display mode, incident light from the backlight passes through the color filter once until the incident light is radiated toward the viewing side. For this reason, the brightness of the image in reflecting display mode is lower than the image in transmitting display mode. In addition, the saturation of the image in transmitting display mode is lower than that in reflecting display mode. With regard to these problems, according to the present embodiment, it is possible to improve the brightness of the image in reflecting display mode, and to reduce the brightness difference and the saturation difference between transmitting display mode and reflecting display mode which have been caused by lowered saturation.

The area of non-colored portion in each colored layer can be determined through tests such that images having predetermined brightness and saturation are obtained. As an example, the area ratio of the non-colored portions shown in FIG. 6 is described. Assuming that the areas of the non-colored portions 302R1, 302G1, 302B1, 302R2, 302G2, and 302B2 in the xy plane are R1, G1, B1, R2, G2, and B2, respectively, the area ratio of these non-colored portions is as follows.

R1:G1:B1:R2:G2:B2=1:2:0.5:2:4:1

As such, changing the areas of the non-colored portions in the colored layers is due to the following reason. The relationship between saturation and brightness is different for each color. In the green color having high relative luminous efficiency, even though the brightness increases, the saturation does not much decrease. However, in the red and blue colors having a lower relative luminous efficiency than the green color, when increasing optical energy until a sufficient brightness is obtained, the saturation excessively decreases. Therefore, in the present embodiment considering these problems, the area ratio of the non-colored portions is determined through tests using various area ratios such that the predetermined brightness and the predetermined saturation can be obtained.

As described above, according to the second embodiment of the present invention, in the reflection weighting region in which the areas of the non-colored portions are large, the amount of light reflected by the non-colored portions is greater than that in the transmission weighting region having a smaller non-colored portions. Therefore, in the reflection weighting region, even during the reflecting display mode in which light passing through the openings does not exist, it is possible to display an image having a sufficient brightness and a reduced saturation. In addition, since the area of the non-colored portion is different for each color, it is possible to improve the brightness by using a difference of a relative luminous efficiency according to a color without excessively lowering the saturation of an image.

Third Embodiment

Figure 7:
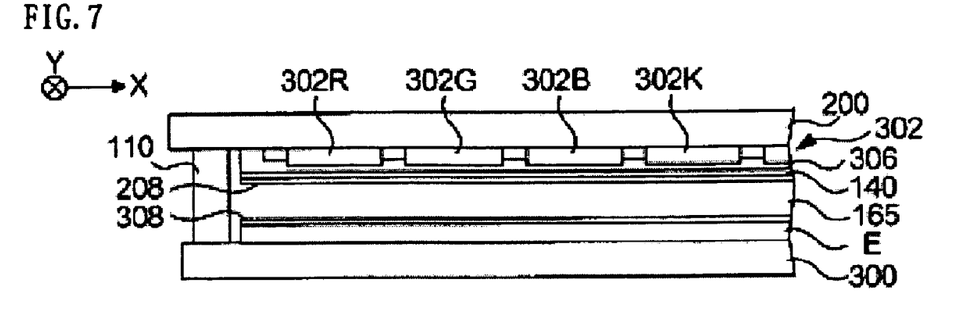
FIG. 7 is a cross-sectional view showing a structure of a liquid crystal device according to a third embodiment of the present invention.

According to the first and second embodiments, the color filter 302 and the reflective layer 301 are provided on the color filter substrate 300 located at the back surface side, and the pixel electrode 161 and the TFD 162 are provided on the counter substrate 200 located at a viewing side. In the liquid crystal device 10 according to the third embodiment, a color filter 302 and a protective layer 306 for covering the color filter 302 are provided on the substrate 200 located at a viewing side, as shown in FIG. 7. Similarly to the first embodiment, the color filter 302 includes the colored layers 302R, 302G and 302B provided so as to correspond to the respective pixels and the shielding layer 302K for removing the gaps between the respective pixels. In addition, the scanning line 140 extending in a direction of X and the alignment film 208 for covering the scanning line 140 are formed on the surface of the protective layer 306.

On the other hand, on the substrate 300 located at a back surface side, an element E including the pixel electrode 161 and the TFD 162 and the alignment film 308 for covering the element E are formed. Specific aspects of the element E are as follows. In descriptions of FIGS. 8 to 10, only a portion corresponding to one pixel is exemplified, but portions corresponding to the other pixels have the same structure.

Figure 8:
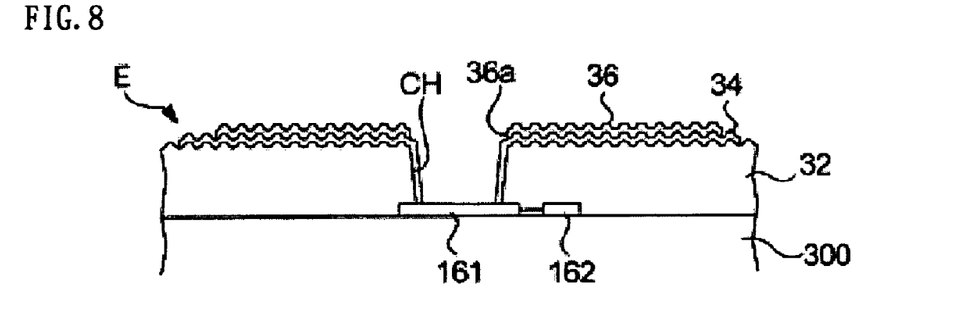
FIG. 8 is a cross-sectional view showing a structure of essential elements provided on a substrate 300, according to a first aspect of the third embodiment.

First Aspect (See FIG. 8)

As shown in FIG. 8, according to this aspect, a plurality of pixel electrodes 161 and a plurality of TFDs 162 each having its one end connected to one pixel electrode 161 are provided on the surface of the substrate 300. The other end of the TFD 162 is connected to the data line (not shown) extending in a direction of Y at a gap between the respective pixel electrodes 161. Each pixel electrode 161 is made of an electrically conductive material such as an ITO (indium tin oxide) having optical transparency.

The surface of the substrate 300 on which the pixel electrodes 161 and the TFDs 162 are formed is covered with a protective layer 32. The protective layer 32 is a film made of a resin material such as acryl or epoxy and the surface of the protective layer 32 forms a rough surface having a plurality of minute convex portions and concave portions. A contact hole CH is formed in a part of the protective layer 32 overlapping with the pixel electrode 161. An intermediate conductive layer 34 made of a conductive material such as molybdenum (Mo) is provided on the surface of the protective layer 32 for every pixel. The intermediate conductive layer 34 extends from a surface of the protective layer 32 to an inner side of the contact hole CH, so that the intermediate conductive layer 34 is electrically connected to the pixel electrode 161.

Further, a reflective layer 36 is formed on the surface of the intermediate conductive layer 34. The reflective layer 36 is a film made of materials having optical reflexivity, such as an elemental metal like aluminum or silver and an alloy using these metals as a basis material, and the surface of the reflective layer 36 has a scattering structure considering the rough surface formed on the surface of the protective layer 32. The reflective layer 36 has an opening 36a corresponding to the contact hole CH. As disclosed in the first and second embodiments, the opening 36a is a portion for transmitting incident light from a bottom surface side toward a viewing side during the transmitting display mode.

The reflective layer 36 is electrically connected to the TFD 162 through the intermediate conductive layer 34 and the pixel electrode 161. In other words, the reflective layer 36 serves as an electrode for applying a voltage to the liquid crystal layer 165 together with the pixel electrode 161 as well as a reflective body for reflecting the incident light from the viewing side during the reflecting display mode. In addition, a configuration that the reflective layer 36 is directly formed on the surface of the protective layer 32 without the intermediate conductive layer 34 interposed therebetween and the reflective layer 36 is electrically connected to the pixel electrode 161 may be used. However, according to this configuration, there is a problem in that the reflective layer 36 erodes because of the battery effect due to a difference of the work functions between the reflective layer 36 and the pixel electrode 161. According to the configuration that the intermediate conductive layer 34 is interposed between the reflective layer 36 and the pixel electrode 161 as in the present aspect, it is possible to prevent the erosion from occurring.

Figure 9:
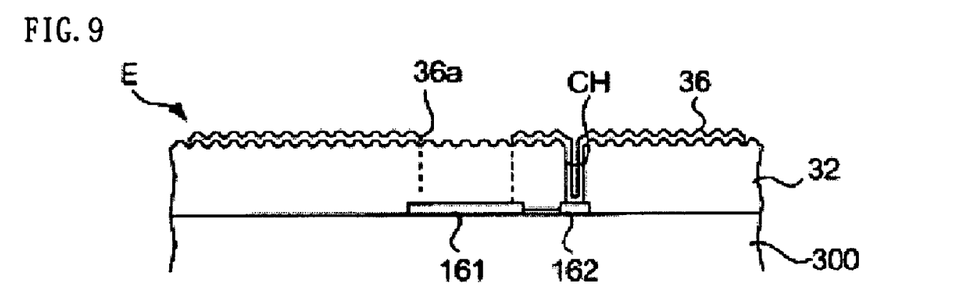
FIG. 9 is a cross-sectional view showing a structure of essential elements provided on a substrate 300, according to a second aspect of the third embodiment.

Second Aspect (See FIG. 9)

The first aspect has a configuration that the reflective layer 36 is electrically connected to the TFD 162 through the pixel electrode 161. The second aspect has a configuration that the reflective layer 36 directly comes into contact with the TFD 162. In other words, as shown in FIG. 9, the configuration that the surface of the substrate 300 on which the pixel electrode 161 and the TFD 162 are provided is covered with the protective layer 32 is the same as that illustrated in FIG. 8. According to the second aspect, a contact hole CH is formed in a part of the protective layer 32 overlapping with the TFD 162. In addition, the reflective layer 36 provided on the surface of the protective layer 32 for every pixel is inserted into an inner side of the contact hole CH, so that the reflective layer 36 is electrically connected to the TFD 162. An opening 36a is formed in a part of the reflective layer 36 overlapping with the pixel electrode 161. According to this aspect, since it does not need to interpose the intermediate conductive layer 34 in FIG. 8 between the reflective layer 36 and the pixel electrode 161, it is possible to make a manufacturing process simple and a manufacturing cost reduced as compared to the configuration illustrated in FIG. 8.

Figure 10:
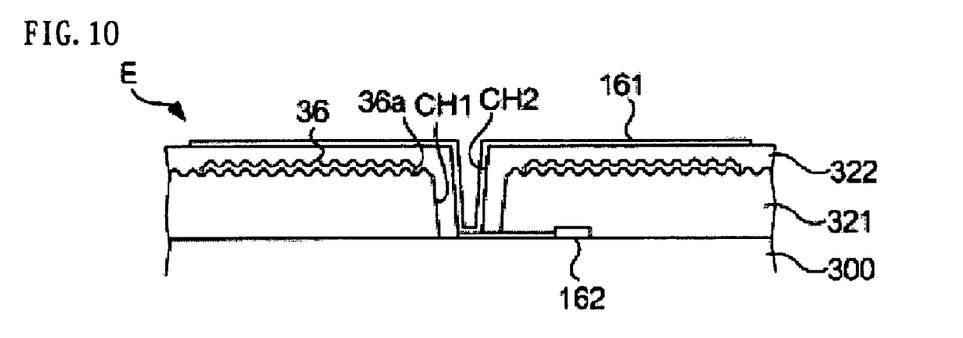
FIG. 10 is a cross-sectional view showing a structure of essential elements provided on a substrate 300, according to a third aspect of the third embodiment.

Third Aspect (See FIG. 10)

The first and second aspects have a configuration that the reflective layer 36 serves as an electrode. In contrast, the third aspect has a configuration that the reflective layer 36 serves as only a reflective body. In other words, according to the third aspect, the TFD 162 provided on the surface of the substrate 300 and a first protective layer 321 for covering the data line (not shown) are formed, as shown in FIG. 10. The surface of the first protective layer 321 is a rough surface, and a contact hole CH1 is formed in a part of the first protective layer 321 overlapping with the TFD 162. The reflective layer 36 is formed on the surface of the first protective layer 321. The reflective layer 36 has an opening 36a provided so as to correspond to the contact hole CH1. In addition, according to this aspect, a configuration that entire surface of the pixel electrode 161 is covered with a second protective layer 322 is exemplified. However, a configuration that a part of the protective layer 32 overlapping the pixel electrode 161 (portion defined by broken lines in the FIG. 9) is removed may be used.

Further, the surface of the substrate 300 on which the reflective layer 36 and the first protective layer 321 are provided is covered with the second protective layer 322. A contact hole CH2 is formed in a part of the second protective layer 322 overlapping the TFD 162. The pixel electrode 161 is provided on the surface of the second protective layer 322 for every pixel, and extends to an inner side of the contact hole CH2 to be connected to the TFD 162. The pixel electrode is made of a conductive material, such as the ITO, having an optical transparency.

According to the respective aspects described above, the area of the opening 36a formed in each reflective layer 36 is selected such that the area of the opening 36a are different from each other in the first region (transmission weighting region 711) and the second region (reflection weighting region 712), similarly to the first embodiment. In addition, the colored layers (302R, 302G and 302B) formed on the substrate 200 have non-colored portions (302R1, 302G1 and 302B1) having different areas in the first and second regions, similarly to the second embodiment. According to the present embodiment, a configuration that has the TFD 162 serving as a two-terminal non-linear element is exemplified. However, instead of using the configuration, a configuration that has a transistor (particularly, TFT (thin film transistor)) may be used.

Fourth Embodiment

Figure 11:
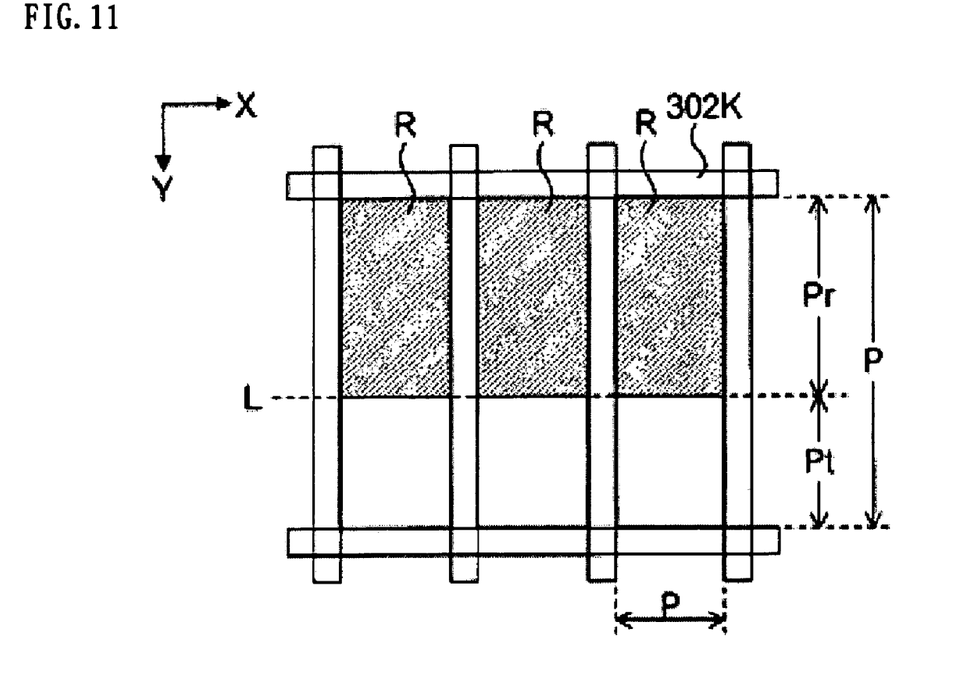
FIG. 11 is a plan view showing a relationship between a reflecting portion and a transmitting portion according to a first aspect of a fourth embodiment.
Figure 12:
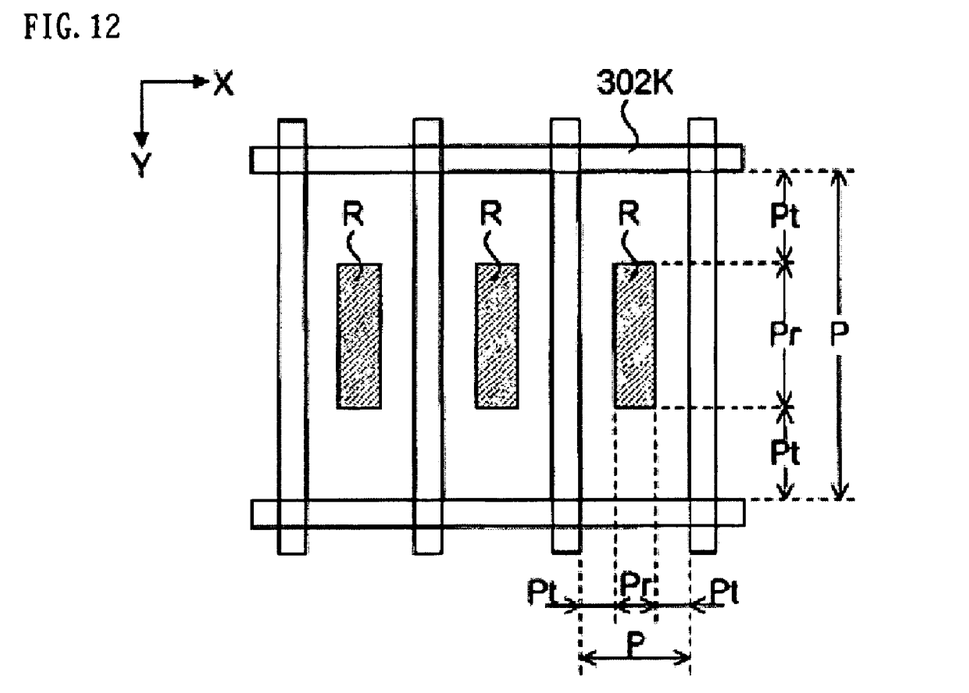
FIG. 12 is a plan view showing a relationship between a reflecting portion and a transmitting portion according to a second aspect of the fourth embodiment.
Figure 13:
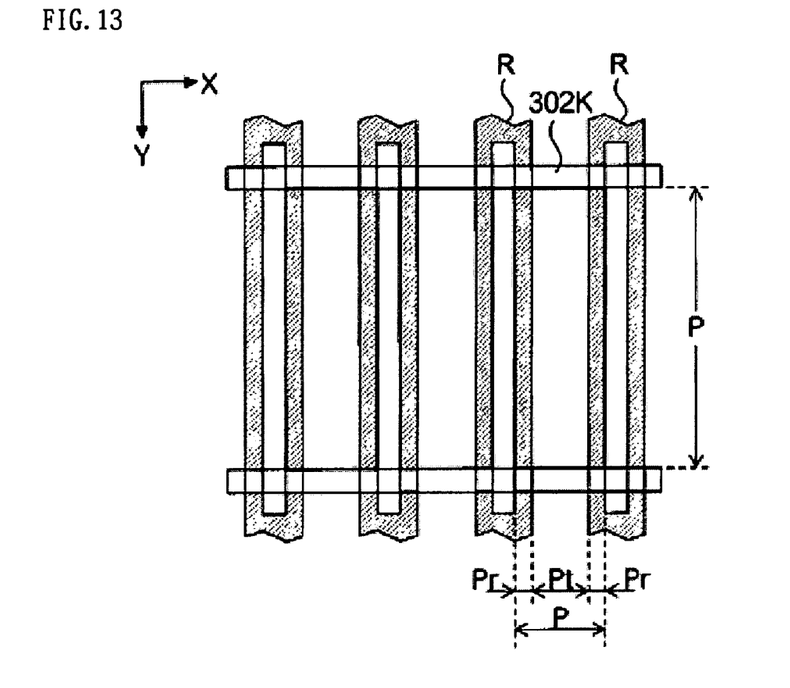
FIG. 13 is a plan view showing a relationship between a reflecting portion and a transmitting portion according to a third aspect of the fourth embodiment.

In according to the first to third aspects, the configuration that the opening is formed in the reflective layer near the central portion of each pixel is exemplified. According to this configuration, the region (reflecting portion) which reflects the incident light from a viewing side in reflecting display mode is formed along the circumference of the pixel, and the region surrounded by the reflecting portion serves as a region (hereinafter, referred to as transmitting portion) which transmits the incident light from the back surface side toward the viewing side in transmitting display mode. However, the positional relationship between the reflecting portion and the transmitting portion is not limited thereto, but may be as follows. Referring to FIGS. 11 to 13, a reflective layer (reflective layer 310 in the first and second embodiments or reflective layer 36 in the third embodiment) R is subjected to a hatching process, for convenience.

First Aspect (See FIG. 11)

As shown in FIG. 11, according to the first aspect, each pixel is divided using a straight line extending in a direction of X (or a direction of Y) as a boundary, and one region of the pixel serves as a reflecting portion Pr and the other region of the pixel serves as a transmitting portion Pt. The reflecting portion Pr is a region on which a reflective layer R is formed and the transmitting portion is a region on which the reflective layer R is not formed. As in the third embodiment, the transmitting portion Pr is supplied with an electrode having an optical transparency (for example, pixel electrode 161 of FIGS. 8 to 10).

Second Aspect (See FIG. 12)

As shown in FIG. 12, according to the second aspect, a relationship between the reflecting portion and the transmitting portion are opposite to those of the first to third embodiments. In other words, a portion located at the central portion of each pixel P serves as the reflecting portion Pr and a portion surrounding the reflecting portion Pr serve as the transmitting portion Pt. More particularly, an island-shaped reflecting layer R (that is, not contacting with the circumference of the pixel P) is provided at a central portion of each pixel P to form the reflecting portion Pr. In addition, the electrodes having an optical transparency are arranged near the reflecting layer to form the transmitting porting Pt.

Third Aspect (See FIG. 13)

According to the third aspect, regions formed along two opposing sides of each pixel P serve as the reflecting portions Pr and a region between the two reflecting portions Pr serves as the transmitting portion Pt. In other words, as shown in FIG. 13, reflecting layers R are linearly arranged along the sides in a direction of Y of the pixel P, so that the reflecting portions Pr are formed. In addition, the electrode having an optical transparency is arranged between the reflecting portions Pr, so that the transmitting portion Pt is formed. In addition, in a case of using a configuration in which the reflective layer R does not serve as an electrode (for example, configurations of the first and second embodiments and of FIG. 10), as shown in FIG. 13, a band-shaped reflective layer R is formed such that it overlaps each pixel P as well as the regions formed along the tow sides of each pixel P. However, in a case of using a configuration in which the reflective layer R serves as the electrode as well, the reflective layer R is formed for each pixel P so as to be spaced apart from each other.

Through the respective aspect described above, the same operation and effect as the first to third embodiments may be obtained. Also in the present aspect, the non-colored layers (302R1, 302G1 and 302B1) are provided in the regions of the colored layers (302R, 302G and 302B) not overlapping with the reflective portion Pr, similarly to the second embodiment.

Modification

The present invention is not limited to the above-mentioned embodiments, but various changes and modifications may be made. For example, the present invention may be applied to the following modification.

At the reflection weighting region, a white and black display may be implemented without the colored layers. In addition, a single color display can be implemented by providing only one colored layer.

Further, in the present invention, another region for performing the intermediate display as well as two kinds of regions like the transmission weighting region and the reflection weighting region may be additionally provided. As shown in FIGS. 4 and 5, when the screen 710 is divided into three or more regions, the area of the transmitting portion (opening 301a in the first embodiment) or the area of the non-colored portion (second embodiment) may be different for each region.

According to the second embodiment, the configuration that the non-colored portion is provided for each pixel in the reflection weighting region and the transmission weighting region is exemplified. However, a configuration that the non-colored portion is provided only in the reflection weighting region but not provided in the transmission weighting region may be used. According to this configuration, the brightness may be different in the reflection weighting region and the transmission weighting region.

According to the present invention, the configuration in which brightness (saturation) during the reflecting display mode is different at the entire transmission weighting region and the entire reflection weighting region is enough. If that condition is satisfied, the area of each pixel belonging to the transmission weighting region and the area of each pixel belonging to the reflection weighting region may be differently set from each other. For example, the area of the transmitting portion of each pixel may be differently set in the transmission weighting region and the reflection weighting region such that a total area of the transmitting portions of all the pixels belonging to the reflection weighting region is smaller than a total area of the transmission portions of all the pixels belonging to the transmission weighting region, by setting the area of the pixel belonging to the reflection weighting region to have a half of the area of the pixel belonging to the transmission weighting region.

According to the above-mentioned embodiments, a mobile phone is exemplified. However, the present invention may be applied to a viewfinder of a video camera or digital still camera. In the video camera or digital still camera, a transmitting display mode is performed by the viewfinder during a photographing period and a reflecting display mode is performed during a non-photographing period. As a result, on the screen, images displaying information, such as date, time, and the battery level can be displayed with sufficient brightness. Since the video camera and the digital still camera are apparatuses having large power consumption at a time of photographing, saving power consumption of the viewfinder is useful to the apparatuses.

What is claimed is:

1. A liquid crystal device having a display region, the liquid crystal device comprising:
   a pair of substrates provided opposite to each other;
   a liquid crystal layer interposed between the pair of substrates;
   first pixels arranged in the center of the display region, the first pixels including a first red-color pixel, a first green-color pixel, and a first blue-color pixel each having a first reflecting portion and a first transmitting portion; and
   second pixels arranged in the display region along an edge of the display region, the second pixels including a second red-color pixel, a second green-color pixel, and a second blue-color pixel each having a second reflecting portion and a second transmitting portion, the second transmitting portions of the second red-color pixel, the second green-color pixel, and the second blue-color pixel each having an area smaller than an area of each of the first transmitting portions of the first red-color pixel, the first green-color pixel, and the first blue-color pixel.

2. The liquid crystal device according to claim 1, wherein:
   the second pixels are located along opposing edges of the display region with the first pixels interposed therebetween.

* * * * *